(12) United States Patent
Esumi

(10) Patent No.: US 6,814,356 B2
(45) Date of Patent: Nov. 9, 2004

(54) INSTALLATION STRUCTURE OF BEARING SEAL

(75) Inventor: Koji Esumi, Okayama (JP)

(73) Assignee: Uchiyama Manufacturing Corp., Okayama (JP)

(*) Notice: Subject to any disclaimer, the term of this patent is extended or adjusted under 35 U.S.C. 154(b) by 0 days.

(21) Appl. No.: 10/130,218

(22) PCT Filed: Sep. 14, 2001

(86) PCT No.: PCT/JP01/08012

§ 371 (c)(1),
(2), (4) Date: May 14, 2002

(87) PCT Pub. No.: WO02/23058

PCT Pub. Date: Mar. 21, 2002

(65) Prior Publication Data

US 2002/0163137 A1 Nov. 7, 2002

(51) Int. Cl.$^7$ ................................. F01D 11/02
(52) U.S. Cl. ................ 277/409; 277/925; 384/484
(58) Field of Search ............... 384/484; 277/409, 277/410, 411, 925, 301, 302, 303

(56) References Cited

U.S. PATENT DOCUMENTS

| | | | | |
|---|---|---|---|---|
| 4,110,883 A | * | 9/1978 | McAllister et al. | 29/898.11 |
| 5,480,235 A | * | 1/1996 | Arai | 384/484 |

FOREIGN PATENT DOCUMENTS

| | | | | |
|---|---|---|---|---|
| JP | 5-209630 | | 8/1993 | |
| JP | 5-296250 | | 9/1993 | |
| JP | 07279978 A | * | 10/1995 | F16C/33/78 |
| JP | 08014261 A | * | 1/1996 | F16C/33/78 |
| JP | 08247156 A | * | 9/1996 | F16C/33/78 |
| JP | 10159859 A | * | 6/1998 | F16C/33/78 |
| JP | 11-44325 | | 2/1999 | |
| JP | 2000-87951 | | 3/2000 | |
| JP | 2000065076 A | * | 3/2000 | F16C/33/78 |
| JP | 2000-104831 | | 4/2000 | |
| JP | 2000-136829 | | 5/2000 | |

* cited by examiner

*Primary Examiner*—William L. Miller
(74) *Attorney, Agent, or Firm*—Wenderoth, Lind & Ponack, L.L.P.

(57) ABSTRACT

A mount construction for a bearing seal is capable of easily and surely installing the bearing seal in a bearing and, after installation, developing a stable seal performance by suppressing an extracting force. The bearing seal, formed by disposing an elastic member having a lip part on one side face of a reinforcement ring, is press-fitted into a ring body or radially reduced ring body in a state where the lip part is bent in a direction away from the outer peripheral edge of the reinforcement ring on the elastic member side of the bearing seal. While maintaining this state, the bearing seal is extruded from the inside of the ring body or the radially reduce ring into the bearing with care so that the lip part is not caught between the reinforcement ring and the bearing is installed on the bearing.

15 Claims, 5 Drawing Sheets

INSTALLATION STRUCTURE OF BEARING SEAL

TECHNICAL FIELD

The present invention relates to a mount construction for a bearing seal that may be incorporated into a computer device, audio device, and the like. More specifically, the present invention relates to the mount construction for the bearing seal in which the bearing seal may be mounted on the bearing for sealing it, wherein the bearing seal, having a reinforcing ring and an elastic element having a lip and disposed on one side of the reinforcing ring, is inserted into the bearing and mounted on it by using a ring element or diameter-squeezing ring that may prevent the before mentioned lip from being wound between the reinforcing ring and the bearing.

BACKGROUND OF THE INVENTION

In a conventional bearing seal that may be mounted on a bearing for preventing the escape of the lubricating oil from the bearing and for protecting the bearing against the entry of any dust or water from the outside, the bearing seal includes an engaging portion that is adapted to engage the fitting groove formed on the bearing when the bearing seal is mounted on the bearing. The engaging portion is formed from a flexible material so that it can provide a good engaging ability. Usually, this mounting is performed by causing the engaging portion to become greatly greatly and pressing it into the fitting groove on the bearing.

For the conventional mount construction as described above, wherein the bearing seal may be mounted on the bearing by pressing its engaging portion into the fitting groove, it is required that the engaging portion should have a volume that is large enough to make it flexible, and allow it to become greatly deformed. This mount construction has several problems, however. One problem is that, when the bearing seal having a large volume engaging portion is mounted on the bearing, the engaging portion tends to become excessively elastic, which imposes a limitation on the ability of the engaging portion to prevent the bearing seal from slipping out of the bearing. Another problem is that the ability of the engaging portion to engage the fitting groove may be reduced because it becomes greatly deformed.

In recent years, an improved mount construction for bearing seal has been developed to address the above problems (for example, Japanese Utility Model Registration Application now published under No. H6 (1994)-51555). This mount construction provides an improvement over the prior one. It is disclosed that the bearing seal includes a reinforcing ring and an elastic element having a lip and disposed on one side of the reinforcing ring, wherein the lip is formed to project radially and outwardly beyond the outer peripheral edge of the reinforcing ring. The bearing seal may be mounted on the bearing by placing it into the bearing from the side of the elastic element, and then by causing the lip to be deformed so that it can be wound around the outer peripheral edge of reinforcing ring and into the fitting groove formed on the bearing.

According to such method as described above, wherein the bearing seal may be secured to the bearing by causing the lip to be wound around the outer peripheral edge of reinforcing ring, the lip has the form of an elastic element made of rubber (which is hereinafter referred to as "rubber lip"), and the said rubber lip is held between the inner peripheral surface of the outer race of the bearing and the outer peripheral surface of the reinforcing ring. Accordingly, the rubber lip may be allowed to deform itself by forcing it to engage both the inner peripheral surface of the outer race of the bearing and the outer peripheral surface of the reinforcing ring. Thus, high dimensional precision is required for accurately placing the bearing seal in the bearing. Otherwise, the rubber lip might not be wound around the outer peripheral edge of the reinforcing ring uniformly, so that the mounting would be imperfect.

For the above reason, each of the individual mechanical component parts of the bearing, as well as each of the components of the bearing seal being mounted on the bearing, must have high dimensional precision when it is fabricated, in order to permit the rubber lip to be held uniformly over the outer and inner peripheral surfaces of the bearing, and to permit the bearing seal to be positioned accurately on the bearing.

When the rubber lip is wound around the outer peripheral edge of reinforcing ring as described above, the rubber lip is greatly deformed so that it can surround the outer periphery of the reinforcing ring. Thus, it may exert a strong pressure upon the reinforcing ring, which must have high mechanical strength and spring action to resist such pressure.

When the bearing seal is mounted on the bearing and the rubber lip is wound around the outer peripheral edge of reinforcing ring, the rubber lip may have some part of its tip appearing and exposed beyond the end of the bearing. Thus, the bearing must have an extra space to accommodate such part of the tip therein.

DISCLOSURE OF INVENTION

In order to solve the problems of the prior art described above, the present invention provides a mount construction for bearing seal that allows it to accept the total volume of the lip of the bearing seal in the fitting groove formed on the outer race of bearing, so that the lip of the bearing seal is engaged in the fitting groove, whereby the bearing seal can be mounted on the bearing firmly and securely. Thus, the strength of sealing and engaging is prevented from being lost, after the bearing seal is mounted on the bearing, and a stable sealing function for the bearing is obtained. Also, according to the present invention, the bearing seal is mounted on the bearing easily and securely by using a ring element or diameter-squeezing ring that allows for mounting the bearing seal on the bearing while accepting the total volume of the lip of the bearing seal in the fitting groove formed on the outer race of bearing, thereby engaging the lip of the bearing seal in the fitting groove.

More specifically, one aspect of the present invention provides a mount construction for bearing seal mounting a bearing seal on a bearing by engaging the bearing seal with a fitting groove formed around an inner periphery of an outer race of the bearing, thereby sealing the inside of the bearing from the outside. A bearing seal includes a reinforcing ring and an elastic element disposed on one side of the reinforcing ring and having a lip formed to project radially and outwardly beyond the outer peripheral edge of the reinforcing ring. The bearing seal is pressed into a ring element from the side on which the reinforcing ring is located, and mounted inside the ring element, wherein the ring element has its inner diameter that is greater than the outer diameter of the reinforcing ring and is smaller than the bore diameter of the outer race of the bearing. When the bearing seal is mounted in the ring element, the lip is bent toward the direction away from the outer peripheral edge of the reinforcing ring on the side of the bearing seal at which the elastic element is located. Then, the ring element is made to engage the bore of the outer race of bearing while directing the elastic element of the bearing seal toward the inside of bearing. In this state, the bearing seal is then pushed out of the ring element and into the bore of the outer race of the bearing with the lip thus bent toward the direction away from the outer peripheral edge of the reinforcing ring on the side of the bearing seal at which the elastic element is located, directing the elastic element of the bearing seal toward the inside of the bearing. This may cause the fitting groove on the outer race of bearing to accept the lip, whereby the lip is engaged in the fitting groove, and the mounting may thus be completed.

Another aspect of the present invention provides a mount construction for a bearing seal mounting a bearing seal on a bearing by engaging the bearing seal with a fitting groove formed around an inner periphery of an outer race of the bearing, thereby sealing the inside of the bearing off from the outside. The bearing seal includes a reinforcing ring and an elastic element disposed on one side of the reinforcing ring and having a lip formed to project radially and outwardly beyond the outer peripheral edge of the reinforcing ring. A diameter-squeezing ring is mounted around the bearing seal. The diameter-squeezing ring has its inner diameter, as it is squeezed, greater than the outer diameter of the reinforcing ring and smaller than the bore diameter of the outer race of the bearing. When the diameter-squeezing ring is mounted around the bearing seal, the lip is bent toward the direction away from the outer peripheral edge of the reinforcing ring on the side of the bearing seal at which the elastic element is located. Then, the diameter-squeezing ring is made to engage the bore of the outer bearing race while directing the elastic element of the bearing seal toward the inside of bearing. In this state, the bearing seal is then pushed out of the diameter-squeezing ring and into the bore of the outer race of bearing with the lip thus bent toward the direction away from the outer peripheral edge of the reinforcing ring on the side of the bearing seal at which the elastic element is located, directing the elastic element of the bearing seal toward the inside of the bearing. This may cause the fitting groove on the outer race of bearing to accept the lip, whereby the lip is engaged in the fitting grove, and the mounting is thus be completed.

According to each of the before described aspects of the present invention, the elastic element may be made of any type of rubber material that has a hardness of 55 to 90° Hs. The rubber material may be molded into the shape of the elastic element, which may then be heated again.

Any type of bearing seal that includes the reinforcing ring and the elastic ring disposed on one side of the reinforcing ring and having the lip formed to project radially and outwardly beyond the outer peripheral edge of the reinforcing ring as described above may be employed. The bearing seal may be obtained by using various methods. For example, the stamping method may be used. In this case, a thin plate having any suitable rubber material on one side thereof is stamped into the shape of the bearing seal. Alternatively, the pre-molding method may also be used. In this case, an elastic element may be obtained by preliminary molding so that it can have the lip, and then this elastic element may be stamped together with the reinforcing ring. Other methods may be employed, and the choice of any of the methods may be determined, depending on the particular needs. It should be understood that the form of the lip is not limited to the shapes shown and described, and the lip may take other different forms.

The reinforcing ring is provided to supplement the mechanical strength of the bearing seal. Thus, the reinforcing ring may be formed from any metal or alloy plates such as steel, stainless, aluminum and the like or any hard plastics, which are all known in the art. Which of those materials should be used may be determined, depending on the performance required for the bearing seal, the particular usages thereof and other needs.

The function of the elastic element having the lip described above is to prevent the bearing seal from slipping out of the bearing on which it is mounted, and to provide the property of sealing the bearing tightly and securely. For example, such rubber materials may include synthetic rubber materials, such as nitrile rubber (NBR), fluororubber (FKM), acryl rubber (ACM), styrene rubber (SBR), polychloroprene rubber (CR), butadiene rubber (BR), isobutylene-isoprene rubber (IIR), and the like. The choice may be made as appropriate, depending on the performance required for the bearing on which the bearing seal is mounted.

The rubber materials from which the elastic element may be made should preferably have the hardness of 55 to 90° Hs. After any rubber material is molded into the shape of the elastic element, it may be processed to provide the higher hardness by heating it again (secondary vulcanization). Although the hardness of 55 to 90° Hs may be comparatively high, the rubber material should preferably have such hardness in that the elastic element made of such rubber material can prevent the bearing seal from slipping out of the bearing, and can seal the bearing more tightly and securely.

As described, the ring element may be used to cause the lip on the elastic element to be bent toward the direction away from the outer peripheral edge of the reinforcing ring on the side of the bearing seal at which the elastic element is disposed, before the bearing seal is pushed into the bearing and secured to the bearing. Specifically, as the bearing seal is pressed into the ring element from the side of the reinforcing ring, the reinforcing ring may act upon the lip so that it can be drawn into the ring element. Then, the ring element may cause the lip to be bent in the manner as described above. Thus, the bearing seal may be mounted on the ring element simply by pressing the bearing seal into the ring element from the side of the reinforcing ring.

As described, the ring element has its inner diameter greater than the outer diameter of the reinforcing ring and smaller than the bore diameter of the outer race of the bearing. This dimensional relationship may be expressed as follows.

bore diameter of the outer race $\geqq$ inner diameter of the ring element > outer diameter of the reinforcing ring Given the above dimensional relationship, the bearing seal can be mounted on the bearing securely, and this mounting can be performed smoothly and properly.

Naturally, the inner diameter of the ring element should be greater than the outer diameter of the reinforcing ring, since the reinforcing ring must be inserted through the ring element.

In the prior art method in which the lip is made to engage the fitting groove on the outer race of the bearing without using the ring element, or more specifically, in the prior art method in which the bearing seal is pressed into the bearing with the lip being directed toward the bearing, the bearing seal may be inserted into the bearing by causing the reinforcing ring to push the lip into the bearing and by then forcing the lip to make sliding contact against the inner peripheral surface of the outer race of the bearing. Some stress may remain in the area of the lip that makes sliding contact against the inner peripheral surface of the outer race, with the lip being held between the peripheral edge of the reinforcing ring and the inner peripheral surface of the outer race. If any stress remains, the lip cannot totally enter the fitting groove when the lip is made to engage the fitting groove. It is noticed that if the gap between the peripheral surface of the reinforcing ring and the bore diameter of the outer race of bearing is smaller than the thickness of the lip, the lip would not be able to overcome the sliding pressure, which might lead to the breakage of the lip. Conversely, if the gap is greater, the lip would not be held between the peripheral surface of the reinforcing ring and the inner peripheral surface of the outer race of the bearing. Thus, the mounting could not be achieved.

In contrast, when the ring element is used, the outer diameter of the elastic element 6 as shown in FIG. 8 may be smaller than the bore diameter $D_2$ of the outer race 2a of the bearing 3, as is the case with the inner diameter $D_3$ of the ring element 7 described above. When the lip is placed in its bent state with its tip being directed toward the inside of the bearing, the bearing seal can be slid into the bearing, beginning with the elastic element 6 followed by the reinforcing ring 5. Thus, the bearing seal can be pushed into the bearing smoothly, without having to exert any excessive pressure load upon the bearing seal.

It should be noted that the possibility of the bearing seal slipping out of the bearing may depend largely upon the parameters for the bore diameter of the outer race of the bearing and the outer diameter of the reinforcing ring, that is, how much clearance can be provided between those two diameters. If the clearance is smaller, the bearing seal can be secured to the bearing, and there will be less risk of the bearing seal slipping out of the bearing. Conversely, if the clearance is larger, the lip might become deformed more largely when it engages the fitting groove, and the risk of the bearing seal slipping out of the bearing will be increased accordingly. By considering the above, the clearance should be determined as appropriate, depending upon the particular type of the bearing used, and the performance required for the particular bearing type.

The diameter-squeezing ring that has been mentioned earlier serves the same purpose as the ring element just described above. The diameter-squeezing ring may take the form of a collet chuck or a C-shape spring pin. The diameter-squeezing ring may have any form, as long as it may be mounted around the bearing seal by gradually reducing its diameter, and it can maintain the lip to be bent toward the direction away from the peripheral edge of the reinforcing ring on the side of the elastic element.

For the same reason as for the ring element described above, naturally, the inner diameter of the diameter-squeezing ring as it is squeezed should be larger than the outer diameter of the reinforcing ring, since the diameter-squeezing ring must be mounted around the reinforcing ring.

Like the ring element, the inner diameter of the diameter-squeezing ring as it is squeezed may be larger than the outer diameter of the reinforcing ring, and may be smaller than the bore diameter of the outer race of the bearing. This dimensional relationship may be expressed as follows.

bore diameter of the outer race ≧ inner diameter of the diameter-squeezing ring as it is squeezed > outer diameter of the reinforcing ring Given the above dimensional relationship, the bearing seal can be mounted on the bearing securely, and this mounting can be performed smoothly and properly.

Any suitable pushing tool may be used when the bearing seal is pushed out of the ring element.

BEST MODE FOR CARRYING OUT THE INVENTION

By referring to the accompanying drawings, the best mode for carrying the present invention is now described in further detail in connection with several preferred embodiments thereof.

Figure 5:
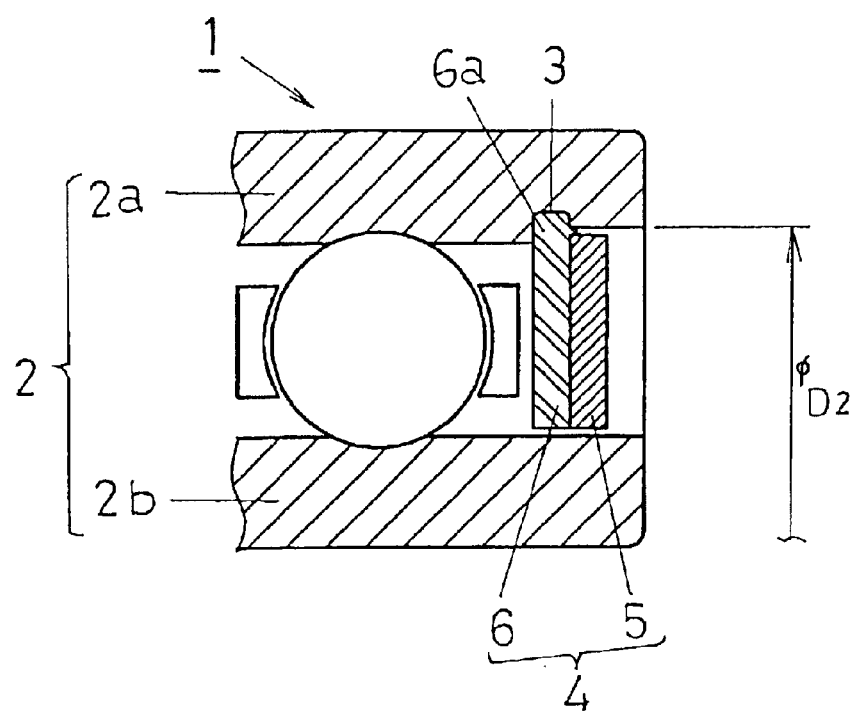
FIG. 5 is a sectional view showing how the bearing seal is mounted on the bearing, with some parts being omitted for clarity and simplicity.

Referring first to FIG. 5, there is shown an installation structure or mount construction for a bearing seal according to the present invention, generally shown by 1, which will be described below.

Figure 1:
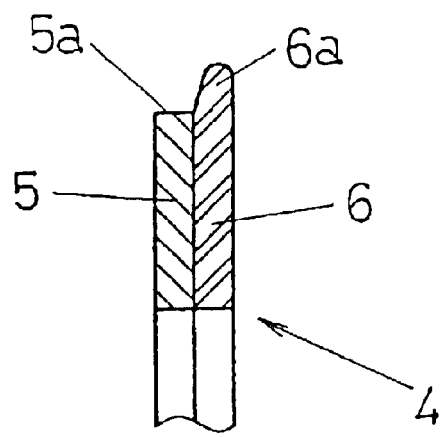
FIG. 1 is a sectional view of a bearing seal in one embodiment of the present invention, with some parts being omitted for clarity and simplicity.

According to this mount construction 1, a bearing seal 4 is designed to be mounted on a bearing 2 for sealing the bearing 2 off from the outside. The bearing 2 comprises an inner race 2b and an outer race 2a including a fitting groove 3 formed around the inner periphery of the outer race 2a. The bearing seal 4 is engaged in the fitting groove 3. The bearing seal 4 includes a reinforcing ring 5 and an elastic element 6 disposed on one side of the reinforcing ring 5, the elastic element 6 including a lip 6a projecting radially and outwardly beyond an outer peripheral edge 5a (FIG. 1) of the reinforcing ring 5.

Figure 2:
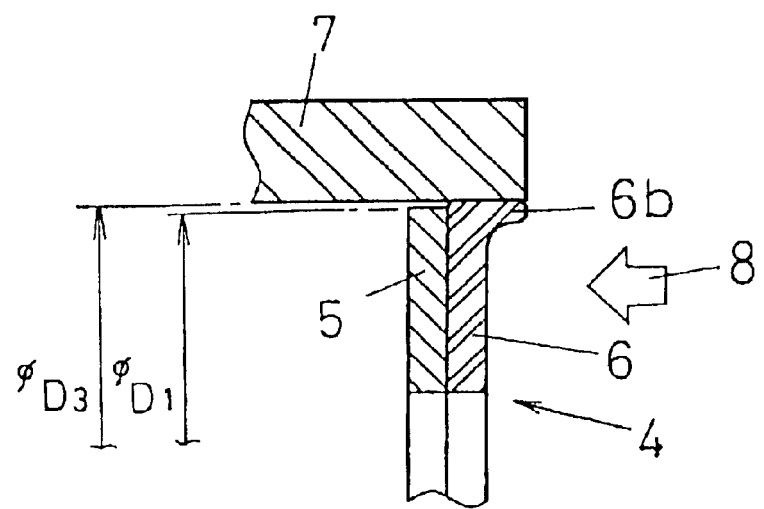
FIG. 2 is a sectional view showing how the bearing seal is mounted to a ring element, with some parts being omitted for clarity and simplicity.

Thus, the bearing seal 4 may be mounted on the bearing 2 by causing the lip 6a to engage the fitting groove 3 on the outer race 2a of the bearing 2. To permit this mounting, a ring element 7 is provided as shown in FIG. 2, which has an inner diameter D3 (FIG. 2) that is greater than the outer diameter D1 of the reinforcing ring 5 and smaller than the bore diameter D2 (FIG. 5) of the outer race 2a of the bearing. Then, the bearing seal 4 may be pressed into the ring element 7 directing the side of its reinforcing ring 5 toward the ring element 7 in the direction of an arrow 8. Pressing the bearing seal 4 causes the lip 6a of the elastic element 6 to be bent toward the direction away from the outer peripheral edge 5a of the reinforcing ring 5. This is shown in FIG. 2. The dimensions D1, D2 and D3 have the following dimensional relationship:

D2≧D3>D1

Figure 3:
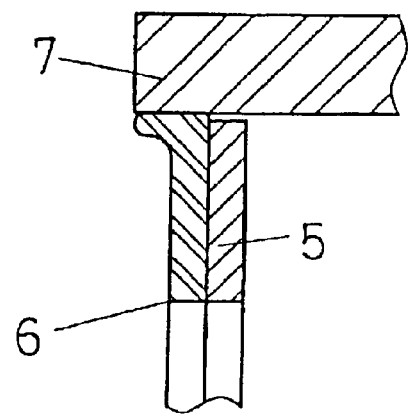
FIG. 3 is a sectional view showing how the bearing seal is mounted to the ring element in which the state shown in FIG. 2 is reversed, with some parts being omitted for clarity and simplicity.

Then, the ring element 7 may be reversed from the state shown in FIG. 2 to the state shown in FIG. 3 while maintaining the state shown in FIG. 2 so that the elastic element 6 of the bearing seal 4 may be directed toward the inside of the bearing 2, thereby permitting the ring element 7 to engage the bore of the outer race 2a of the bearing 2.

When the bearing seal 4 is in the state shown in FIG. 3, in which the lip 6a of the elastic element 6 is existing at one side of the bearing seal 4 on which the elastic element 6 is disposed and is bent toward the direction away from the outer peripheral edge 5a of the reinforcing ring 5, the bearing seal 4 may then be pushed out of the ring element 7 in the direction of an arrow 10 by means of any suitable pushing tool 9, moving into the bore of the outer race 2a of the bearing 2. This may cause the lip 6a to engage the fitting groove 3 on the outer race 2a of the bearing 2. Finally, the mount construction 1 may be completed, wherein the bearing seal 4 is secured to the bearing 2 as shown in FIG. 5.

The bearing seal 4 comprises a steel plate and a synthetic rubber element having a part to be formed as a lip, and may be obtained by stamping them together by using the pre-molding method. More specifically, the bearing seal 4 may be formed so that it may include a reinforcing ring 5 and an elastic element 6 disposed on one side of the reinforcing ring 5 and including a lip 6a projecting radially and outwardly beyond the outer peripheral edge 5a (FIG. 1) of the reinforcing ring 5. The synthetic rubber element may be composed of any combination of any ones of nitrile rubber (NBR), fluororubber (FKM), acryl rubber (ACM), styrene rubber (SBR), polychloroprene rubber (CR), butadiene rubber (BR), isobulylene-isoprene rubber (IIR) and the like. The steel plate and synthetic rubber element have thus been molded into a bearing seal 4, which may then be processed by heating it again (secondary vulcanization). The elastic element of the bearing seal thus obtained has a hardness of 55 to 90° Hs. The bearing seal 4 may be mounted to the bearing 2 so securely that it will not slip out of the bearing 2, and the bearing 2 can be sealed tightly.

As the inner diameter D3 of the ring element 7 is greater than the outer diameter D1 of the reinforcing ring 5, so that the bearing seal 4 can be mounted on the ring element 7 simply by pressing the bearing seal 4 into the ring element 7 from the side of the reinforcing ring 5 in the direction of an arrow 8, the bearing seal 4 is mounted on the ring element 7 with the lip 6a of the elastic element 6 bent toward the direction away from the outer peripheral edge 5a of the reinforcing ring 5 on the side of the bearing seal 4 at which the elastic element 6 is disposed.

Figure 8:
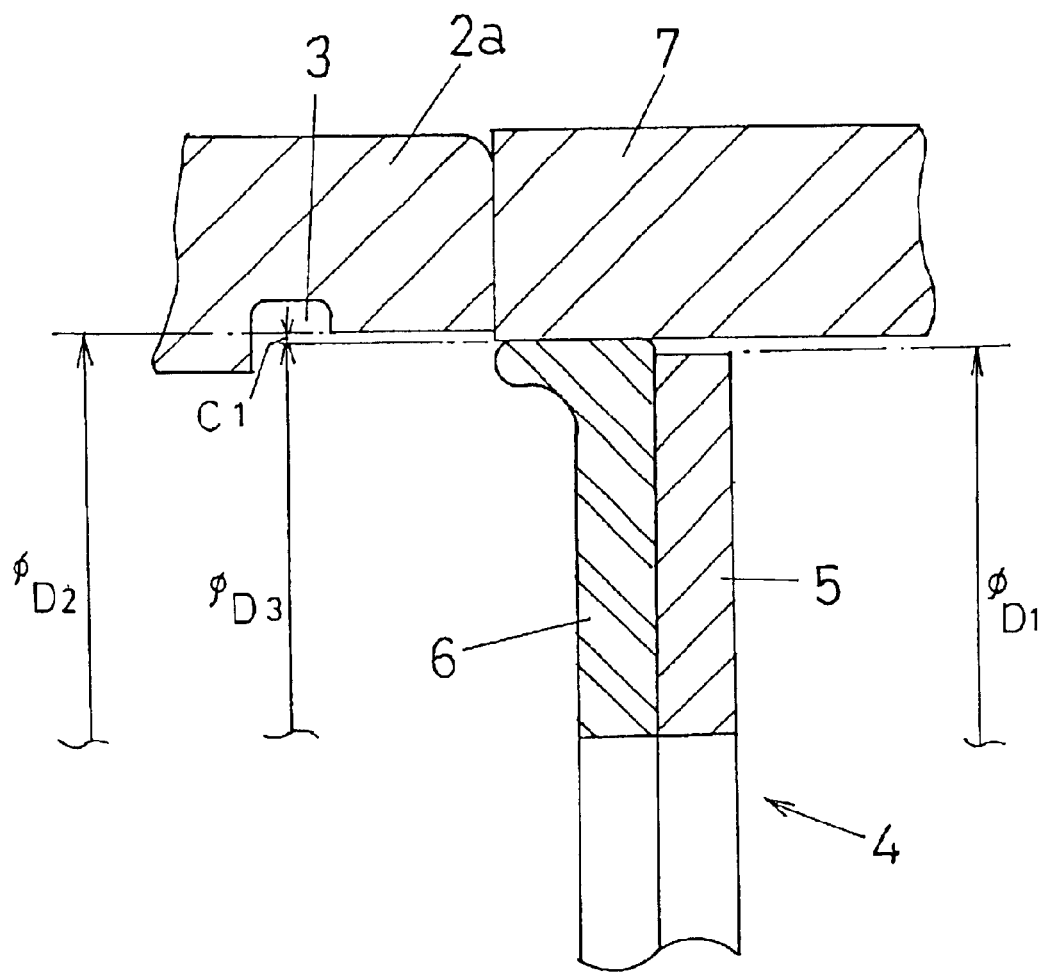
FIG. 8 is a diagram that illustrates the dimensional relationship between the bore diameter of the outer race of the bearing and the inner diameter of the ring element.

At the next step, the ring element 7 is reversed, and the ring element 7 is made to engage the bore of the outer race of bearing, directing the elastic element 6 of the bearing seal 4 toward the inside of bearing 2. The engaging part comprises ring element 7 and outer race 2a of bearing and is shown in FIG. 8.

Figure 4:
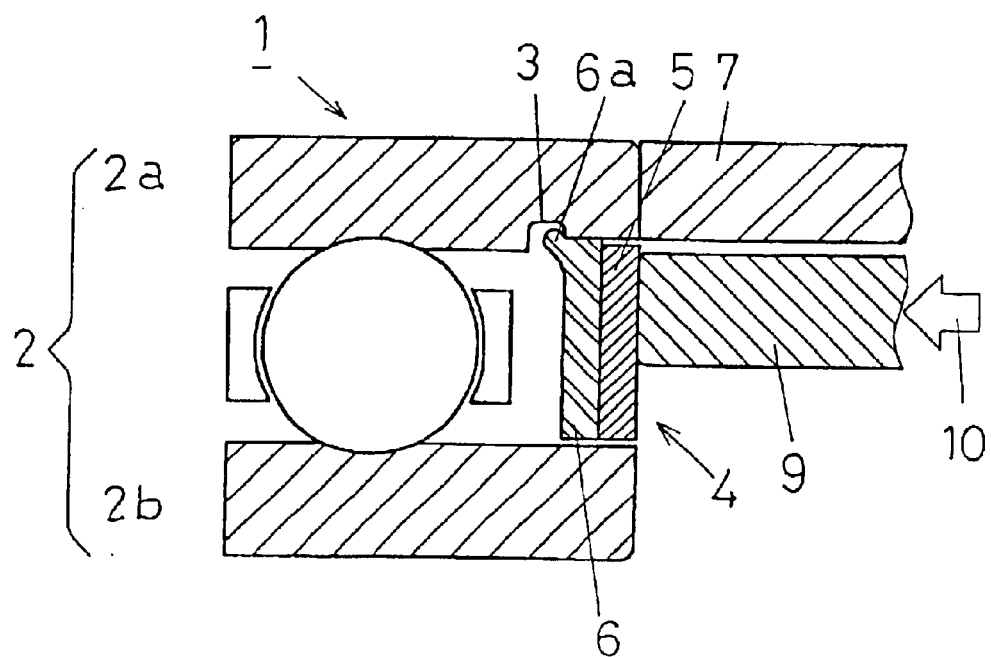
FIG. 4 illustrates how the bearing seal mounted on the ring element as shown in FIG. 3 is pressed into the bearing.

In the next step, the bearing seal 4 is pushed out of the ring element 7 in the direction of an arrow 10 by means of pushing tool 9 as shown in FIG. 4. In this process, it is important to slide the bearing seal into the bearing, beginning with the projected lip 6a followed by the reinforcing ring 5. During this process, there is a clearance C1 which corresponds to one half of difference between the bore diameter D2 of the outer race and the inner diameter D3 of the ring element 7, as shown in FIG. 8. Bearing seal 4 can thus be pressed into the bearing smoothly, and the state shown by FIG. 4 is obtained. Then, the bearing seal 4 is pushed into the bearing in the direction of an arrow 10 from the state as shown in FIG. 4, the part of lip 6a, which is to be engaged into the groove 3, is engaged and accepted in the groove 3 accurately and perfectly, whereby the bearing seal 4 is finally mounted on the bearing An alternative embodiment is next described, wherein the ring element 7 is replaced by a diameter-squeezing ring. The diameter-squeezing ring may have the form of a collet chuck 11 shown in FIG. 6, a C-shape spring pin 12 shown in FIG. 7 or the like, which may be operated to squeeze the lip 6a of the bearing seal 4 totally from its outer circumference.

Figure 6:
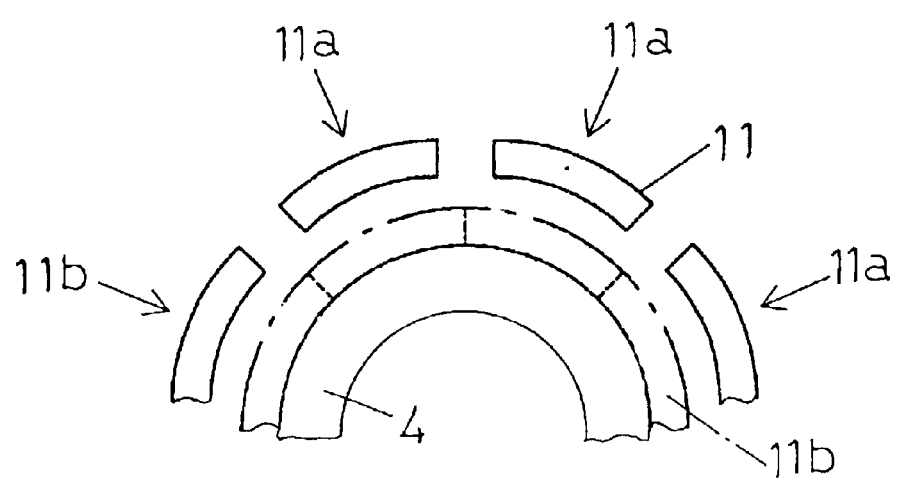
FIG. 6 illustrates and shows how a diameter-squeezing ring is mounted around the periphery of the bearing seal in accordance with another embodiment.

The collet chuck 11 has a series of individual squeezing pawls 11a that are separated from each other at regular intervals. The inner diameter of the collet chuck 11 may be reduced as indicated by 11b by squeezing those individual squeezing pawls 11a together. When the collet chuck 11 is mounted around the bearing seal 4 as shown in FIG. 6 by reducing its inner diameter, if the lip 6a is bent toward the direction away from the outer peripheral edge 5a of the reinforcing ring 5 while the lip 6a is existing at one side of the bearing seal 4 on which the elastic element 6 is disposed, the resulting state is the same as the state shown in FIG. 2 in the preceding embodiment. The subsequent steps are the same as those in the previous embodiment, and the mount construction 1 for the bearing seal as shown in FIG. 5 may be provided by following those steps.

Figure 7:
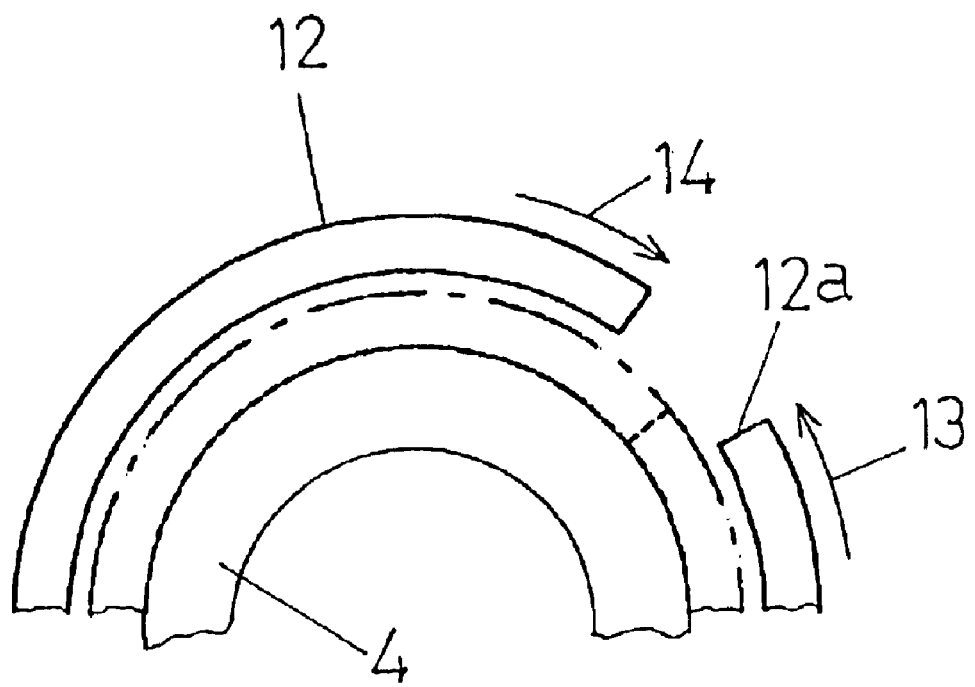
FIG. 7 illustrates and shows how another diameter-squeezing ring is mounted around the periphery of the bearing seal in accordance with another embodiment.

The C-shape spring pin 12 is in the form of a ring-like pin having an opening 12a. The C-shape spring pin may have its diameter reduced by squeezing the opening 12a in the direction of arrows 13 and 14. When the C-shape spring pin is mounted around the bearing seal 4 as shown in FIG. 7 by reducing its inner diameter, if the lip 6a is bent toward the direction away from the outer peripheral edge 5a while the lip 6a is existing at one side of the bearing seal 4 on which the elastic element 6 is disposed, the resulting state is the same as the state shown in FIG. 2 in the preceding embodiment. The subsequent steps are the same as those in the previous embodiment, and the mount construction 1 for the bearing seal as shown in FIG. 5 may be provided by following those steps.

It may be appreciated from the foregoing description that the present invention provides an installation structure or mount construction that allows the bearing seal to be mounted on the bearing in an easy and secure way. After the bearing seal has been mounted on the bearing, according to the mount construction of the present invention, it can prevent the strength of sealing and engaging from being lost, and give a stable seal property.

Also, when the bearing seal is mounted on the bearing, the form of lip to be inserted is made by using a ring element, a diameter-squeezing ring such as a collet chuck, C-shape spring pin and the like, so that the mounting of the bearing seal on the bearing can be completed independently of the particular diameter size of the bearing seal, the particular size and shape of the fitting groove on the bearing, and the like.

As the mount construction is so designed that the reinforcing ring can be placed under as little stress as possible when the bearing seal is mounted on the bearing, the reinforcing ring can be thinner. Thus, the space in the bearing required to be sealed by the bearing seal can be minimized.

The mount construction is also so designed as to permit the lip to engage the fitting groove on the bearing tightly and securely, when the bearing seal is mounted on the bearing. As the lip has a relatively high hardness, it will prevent the bearing seal from slipping out of the bearing. Thus, the bearing seal can provide the high sealing capability.

What is claimed is:

1. A mounting arrangement for mounting a bearing seal, comprising:
   a bearing seal comprising:
      a reinforcing ring, and
      an elastic element disposed on one side of said reinforcing ring and having a lip projecting radially outwardly beyond an outer peripheral edge of said reinforcing ring; and a mounting ring having an inner diameter that is greater than an outer diameter of said reinforcing ring, said bearing seal being pressed into said mounting ring such that said lip of said elastic element is bent in an axial direction away from said outer peripheral edge of said reinforcing ring and on a side of said bearing seal at which said elastic element is located such that, when said mounting ring is brought into engagement with a bore of an outer race of a bearing with said lip bent in said direction away from said outer peripheral edge of said reinforcing ring and toward the inside of the bearing and the side of said bearing seal at which said elastic element is located directed toward the inside of the bearing, said bearing seal can be pushed out of said mounting ring in said direction away from said outer peripheral edge of said reinforcing ring and into the bearing so that said lip can be brought into engagement with a fitting groove on an outer race of the bearing.

2. The mounting arrangement of claim 1, wherein said mounting ring comprises a ring element.

3. The mounting arrangement of claim 1, wherein said mounting ring comprises a diameter-squeezing ring which has said inner diameter greater than said outer diameter of said reinforcing ring in a squeezed position thereof.

4. The mounting arrangement of claim 3, wherein said diameter-squeezing ring comprises a collet chuck.

5. The mounting arrangement of claim 3, wherein said diameter squeezing ring comprises a C-shape spring pin.

6. The mounting arrangement of claim 1, wherein said elastic element is made of a rubber having a hardness of 55 to 90° Hs.

7. The mounting arrangement of claim 1, wherein said elastic element is made of rubber that has been reprocessed under applied heating after being molded into the shape of said elastic element.

8. A mounting arrangement for mounting a bearing seal, comprising:

a bearing seal comprising:

a reinforcing ring, and an elastic element disposed on one side of said reinforcing ring and having a lip projecting radially outwardly beyond an outer peripheral edge of said reinforcing ring;

a bearing that includes an outer race having a fitting groove;

a mounting ring having an inner diameter that is greater than an outer diameter of said reinforcing ring and no larger than a bore diameter of said outer race, said bearing seal being pressed into said mounting ring such that said lip of said elastic element is bent in an axial direction away from said outer peripheral edge of said reinforcing ring and on a side of said bearing seal at which said elastic element is located such that, when said mounting ring is brought into engagement with a bore of said outer race of said bearing with said lip bent in said direction away from said outer peripheral edge of said reinforcing ring and toward the inside of said bearing and the side of said bearing seal at which said elastic element is located directed toward the inside of the bearing, said bearing seal can be pushed out of said mounting ring in said direction away from said outer peripheral edge of said reinforcing ring and into said bearing so that said lip can be brought into engagement with said fitting groove on said outer race of said bearing.

9. The mounting arrangement of claim 8, wherein said inner diameter of said mounting ring is smaller than the bore diameter of said outer race.

10. The mounting arrangement of claim 9, wherein said mounting ring comprises a ring element.

11. The mounting arrangement of claim 9, wherein said mounting ring comprises a diameter-squeezing ring which has said inner diameter greater than said outer diameter of said reinforcing ring in a squeezed position thereof.

12. The mounting arrangement of claim 11, wherein said diameter-squeezing ring comprises a collet chuck.

13. The mounting arrangement of claim 11, wherein said diameter squeezing ring comprises a C-shape spring pin.

14. The mounting arrangement of claim 9, wherein said elastic element is made of a rubber having a hardness of 55 to 90° Hs.

15. The mounting arrangement of claim 9, wherein said elastic element is made of rubber that has been reprocessed under applied heating after being molded into the shape of said elastic element.

* * * * *

UNITED STATES PATENT AND TRADEMARK OFFICE
CERTIFICATE OF CORRECTION

PATENT NO. : 6,814,356 B2
DATED : November 9, 2004
INVENTOR(S) : Koji Esumi

It is certified that error appears in the above-identified patent and that said Letters Patent is hereby corrected as shown below:

<u>Title page,</u>
Insert Item:
-- [30]      Foreign Application Priority Data
    September 14, 2000    (JP) ……………………….. 2000-279948 --

Signed and Sealed this

Fifteenth Day of February, 2005

JON W. DUDAS
*Director of the United States Patent and Trademark Office*